(12) United States Patent
Sirosaki et al.

(10) Patent No.: US 9,346,419 B2
(45) Date of Patent: May 24, 2016

(54) SIGN PLATE

(71) Applicant: Nippon Carbide Industries Co., Inc., Minato-ku, Tokyo (JP)

(72) Inventors: Katsuhisa Sirosaki, Uozu (JP); Ikuo Mimura, Uozu (JP)

(73) Assignee: NIPPON CARBIDE INDUSTRIES CO., INC., Tokyo (JP)

( * ) Notice: Subject to any disclaimer, the term of this patent is extended or adjusted under 35 U.S.C. 154(b) by 5 days.

(21) Appl. No.: 14/373,151

(22) PCT Filed: Jan. 30, 2013

(86) PCT No.: PCT/JP2013/051981
§ 371 (c)(1),
(2) Date: Jul. 18, 2014

(87) PCT Pub. No.: WO2013/115216
PCT Pub. Date: Aug. 8, 2013

(65) Prior Publication Data
US 2014/0366411 A1    Dec. 18, 2014

(30) Foreign Application Priority Data

Feb. 2, 2012 (JP) ............................ 2012-020681
May 22, 2012 (JP) ............................ 2012-117017

(51) Int. Cl.
| G09F 13/16 | (2006.01) |
| B60R 13/10 | (2006.01) |
| G06K 7/10 | (2006.01) |
| G06K 19/077 | (2006.01) |

(52) U.S. Cl.
CPC ............ *B60R 13/10* (2013.01); *G06K 7/10009* (2013.01); *G06K 19/07771* (2013.01); *G06K 2007/10504* (2013.01)

(58) Field of Classification Search
CPC ........................................ G06K 2007/10504
See application file for complete search history.

(56) References Cited

U.S. PATENT DOCUMENTS

| 5,608,391 | A  | * | 3/1997 | Bantli et al. | 340/933 |
| 7,117,794 | B2 | * | 10/2006 | Taffinder | 101/483 |
| 2004/0218273 | A1 | * | 11/2004 | Mimura | 359/530 |
| 2007/0171077 | A1 | * | 7/2007 | Kawarizadeh | 340/572.8 |

(Continued)

FOREIGN PATENT DOCUMENTS

| EP | 2 131 217 | 12/2009 |
| JP | 2006-186742 | 7/2006 |

(Continued)

*Primary Examiner* — Kristina Junge
(74) *Attorney, Agent, or Firm* — Fitzpatrick, Cella, Harper & Scinto

(57) ABSTRACT

A sign plate 1 includes a plate-shaped metal plate 2 having a a slot 23 which penetrates from the front surface 21 toward the back surface 22, an RFID inlay 3 arranged on the front surface 21 of the metal plate 2 so as to straddle the slot 23, and a retroreflective sheeting 4 arranged on the front surface 21 of the metal plate 2 and having a mirror reflective region 41 and a non-mirror reflective region 42. In a plan view of the retroreflective sheeting 4, the mirror reflective region 41 includes a plurality of mirror reflective regions which are formed as independent regions by being divided by the non-mirror reflective region 42, the slot 23 region overlaps the mirror reflective region 41 and the non-mirror reflective region 42, and the overlapping mirror reflective region 41 does not straddle the slot 23.

4 Claims, 5 Drawing Sheets

(56) References Cited

U.S. PATENT DOCUMENTS

2009/0058602 A1* 3/2009 Harinck ................ 340/10.1
2011/0258894 A1* 10/2011 Beenken ................ 40/208

FOREIGN PATENT DOCUMENTS

JP 2008-284967 11/2008
WO 2008/107987 9/2008

* cited by examiner

SIGN PLATE

This application is a National Phase of PCT/JP2013/051981 filed Jan. 30, 2013, which in turn claims benefit of Japanese Patent Application Nos. 2012-020681 filed Feb. 2, 2012 and 2012-117017 filed May 22, 2012.

TECHNICAL FIELD

The present invention relates to a sign plate suitable for a vehicle number plate which incorporates an RFID inlay, for example.

BACKGROUND ART

In recent years, the use of an RFID (Radio Frequency Identification) inlay using a semiconductor chip which is capable of reading and writing information for information management of articles and physical distribution management or she like is progressing.

The RFID inlay is configured by a IC chip having a memory which records information, an antenna which receives a radio wave and transmits information which is recorded in the memory of the IC chip via the radio wave, and a base material on which the IC chip and the antenna are mounted.

Additionally, in recent years, introducing a system that the RFID inlay is incorporated in a vehicle number plate and information of the owner or the vehicle or the like is detected without contact to be helpful for preventing crimes or the like is under consideration (refer to Patent Document 1).

In a vehicle number plate of Patent Document 1, a slot is formed on a metal plate thereof and an RFID inlay is arranged on the back surface of the metal plate so as to straddle the slot. Additionally, an external light layer is formed on a front, surface of the metal plate in order to improve visibility at night,

CITATION LIST

Patent Document

[Patent Document 1] Japanese Patent Application Laid-Open No. 2008-284967

SUMMARY OF INVENTION

Objects to be Achieved by the Invention

However, when a retroreflective sheeting is stuck to the vehicle number plate of Patent Document 1 as an external light reflective layer in order to improve visibility at night, information cannot be read from the RFID inlay and the distance that the information can be read becomes excessively short in some cases.

Further, when a retroreflective sheeting, on which a through hole with a substantially identical shape as the slot is formed, is stuck to the vehicle number plate so that the through hole is arranged above the slot, although information can be read from the RFID inlay, the arrangement locations of the slot and the RFID can be identified by appearance, thereby easily being a target of illegal alternation or the like.

Then, the present invention has been made in order to solve the above-mentioned problem, and an object thereof is to provide a sign plate of which the distance that information can be read from the RFID inlay is long, visibility at night is excellent, and an arrangement location of the RFID inlay cannot be identified.

Means for Achieving the Objects

In order to solve the above-mentioned problem, a sign plate of she present invention, includes: at plate-shaped conductive plate having a front surface and a back surface and also having a slot which penetrates from the front surface toward the back surface; an RFID inlay arranged on the front surface or the back surface of the conductive plate so as to straddle the slot; and a retroreflective sheeting arranged on the front surface of the conductive plate so as to cover the slot and having a mirror reflective region where a mirror reflective layer is formed and a non-mirror reflective region where the mirror reflective layer is not formed, wherein, in a plan view of the retroreflective sheeting viewed from a front surface side of the retroreflective sheeting, the mirror reflective region includes a plurality of mirror reflective regions which are formed as independent regions by being divided by the non-mirror reflective region, a slot region where the slot is formed overlaps the mirror reflective regions and the non-mirror reflective region, and each of the mirror reflective regions overlapping the slot region does not straddle the slot.

According to such a sign plate, the RFID inlay is arranged on the front surface or the back surface of the conductive plate straddling the slot, and the mirror reflective region and the non-mirror reflective region of the retroreflective sheeting are arranged on the slot (the front surface side of the conductive plate), and thereby the distance that information can be read from the RFID inlay can be longer. Additionally, the front surface of the metal, plate is covered with the retroreflective sheeting, thereby improving visibility at night as well as making it possible that arrangement locations of the slot and RFID cannot be identified by appearance.

Furthermore, the mirror reflective region of the retroreflective sheeting is arranged on the slot so as not to straddle the slot, and thereby the distance that information can be read from the RFID inlay can be farther longer.

Further, it is preferable that, in a plan view of the retroreflective sheeting viewed from the front surface side, the non-mirror reflective region has a mesh shape, and a path length of the non-mirror reflective region overlapping the slot region is 200% or more with respect to a length of an outer periphery of the slot.

A path length of the non-mirror reflective region overlapping the slot region is 200% or more with, respect to the length of the outer periphery of the slot, and thereby the distance that information can be read from the RFID inlay can be further longer, and the distance can be stably ensured.

Further, it is preferable that, in a plan view of the retroreflective sheeting viewed from the front surface side, the non-mirror reflective region has a mesh shape, and a line width of the non-mirror reflective region overlapping the slot region is 0.01 mm to 1.0 mm.

The line width of the non-mirror reflective region has a range of 0.01 mm to 1.0 mm, and therefore the distance that information can be read from the RFID inlay can be further longer, and also the luminance of the retroreflective sheeting can be optimized.

Further, it is preferable that, in a plan view of the retroreflective sheeting viewed from the front surface side, a total area of the mirror reflective regions overlapping the slot region is 80% to 96% with respect to an area of the slot region.

The total area of the mirror reflective regions overlapping the slot region is to be 80% to 96% with respect so the area of the slot region, and therefore the distance that, information can be read from the RFID inlay can be further longer, and the luminance of the retroreflective sheeting can be optimised.

Effect of Invention

As mentioned above, the present invention provides a sign plate of which the distance that information can be road from the RFID inlay is long, visibility at night is excellent, and which incorporates the RFID inlay that the arrangement location thereof cannot be identified.

DESCRIPTION OF EMBODIMENTS

Hereinafter, a vehicle number plate will be described as an embodiment of the sign plate according to the present invention.

Figure 1:
FIG. 1 is a plan view of a vehicle number plate of this embodiment.
Figure 2:
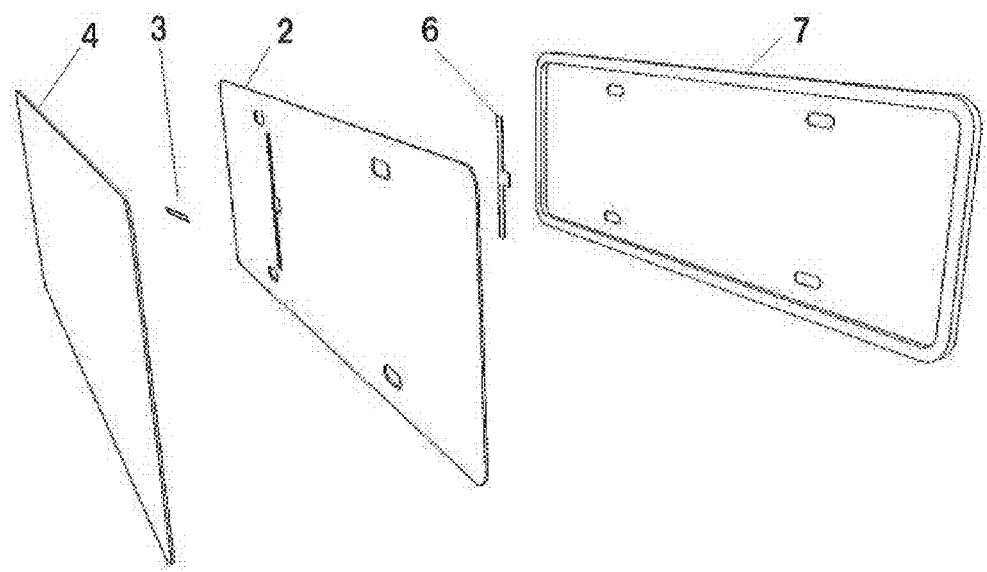
FIG. 2 is an exploded perspective view of the vehicle number plate in FIG. 1.
Figure 3:
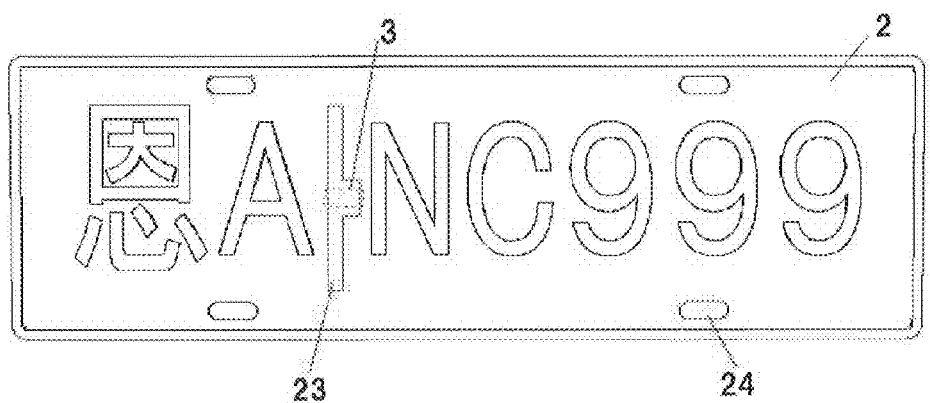
FIG. 3 is a plan view of a metal plate which configures the vehicle number plate in FIG. 1.
Figure 4:
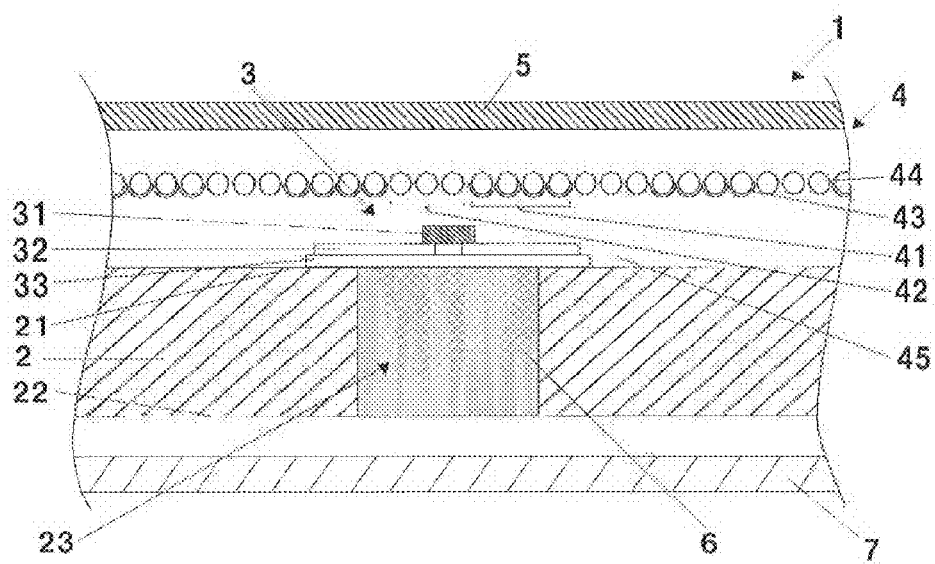
FIG. 4 is a cross-sectional view of the vehicle number plate in FIG. 1.
Figure 5:
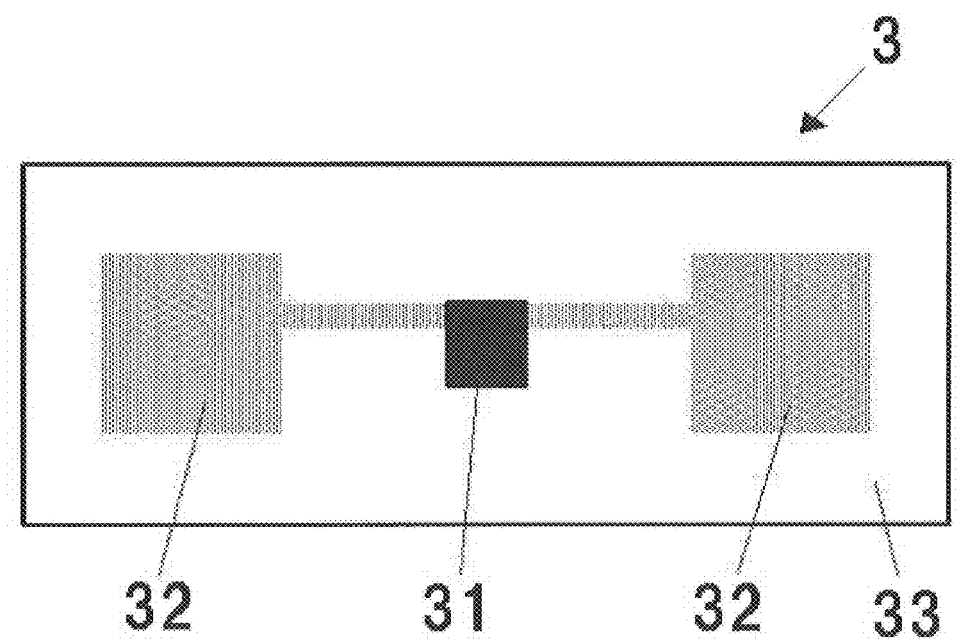
FIG. 5 is a plan view of an RFID inlay which configures the vehicle number plate in FIG. 1.
Figure 6:
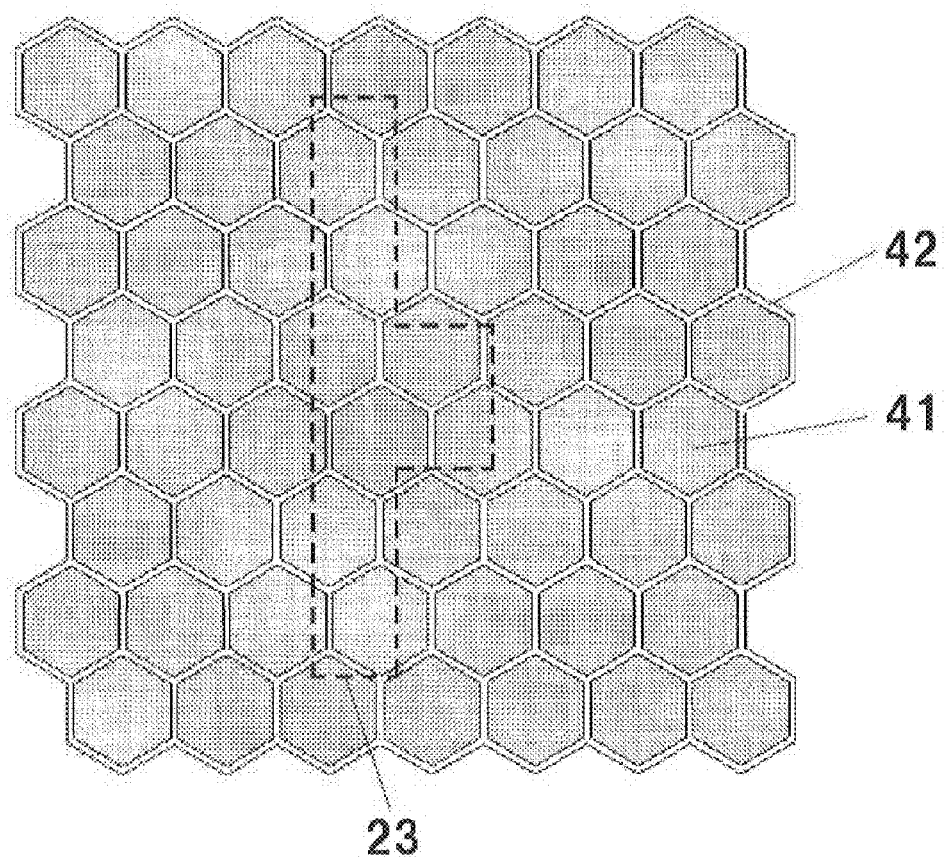
FIG. 6 is a plan clew illustrating mirror reflective regions and a non-mirror reflective region of a retroreflective sheeting which configures the vehicle number plate in FIG. 1.
Figure 7:
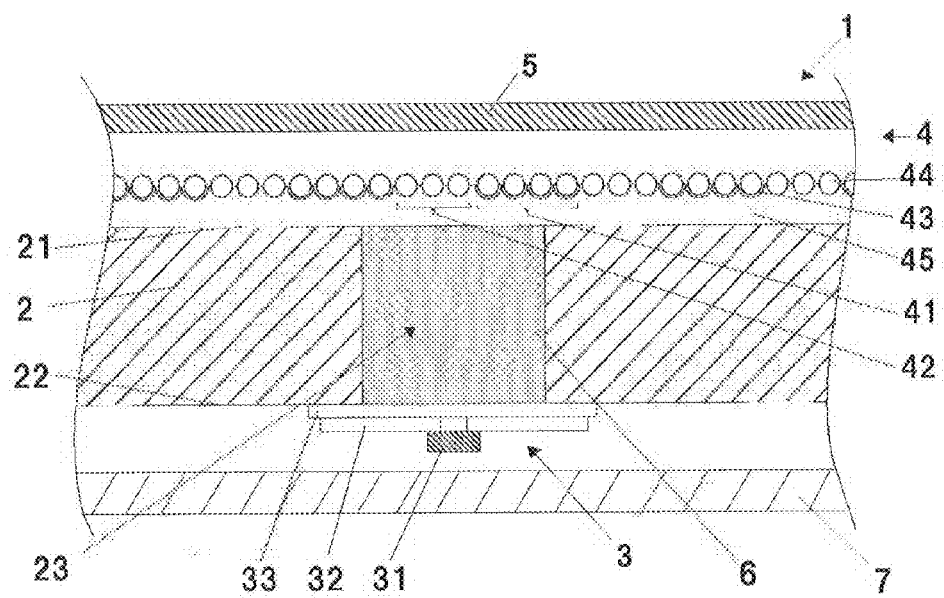
FIG. 7 is a cross-sectional view of a vehicle number plate of another embodiment.

FIG. 1 is a plan view of a vehicle number plate of this embodiment. FIG. 2 is an exploded perspective view of the vehicle number plate in FIG. 1. FIG. 3 is a plan view of a metal plate which configures the vehicle number plate in FIG. 1, FIG. 4 is a cross-sectional view of the vehicle number plate in FIG. 1, FIG. 5 is a plan view of an RFID inlay which configures the vehicle number plate in FIG. 1. FIG. 6 is a plan view illustrating mirror reflective regions and a noir-mirror reflective region of a retroreflective sheeting which configures the vehicle number plate in FIG. 1. FIG. 7 is a cross-sectional view of a vehicle number plate of another embodiment.

Note that, in order to facilitate understanding of this embodiment, a sign portion is not illustrated on the retroreflective sheeting and the metal plate in FIG. 2, a region that an RFID inlay is formed is illustrated by a dotted line in FIG. 3, and a region where a slot is formed (slot region) is illustrated by a dotted fine in FIG. 6.

A vehicle number plate 1 of FIG. 1 includes a metal plate 2, an RFID inlay 3, a retroreflective sheeting 4, a pad 6, and a back plate 7, as illustrated in FIG. 2.

The metal plate 2 is a flat plate-like metal plate (aluminum plate, and iron plate, for example) which has a front surface 21 and a back surface 22 as illustrated in FIG. 3. On the front surface 21 of the metal plate 2, a one-digit Chinese character ("恩") a three-digit alphabet ([A] [N] [C]), and a three-digit number ([9] [9] [9]) are embossed so as to be protruded to the side of the front surface 21. Further, an interval between [A] and [N] is wider than one between other letters or figures, and a slot 23 which penetrates from, the front surface 21 to the back surface 22 is formed in the interval. Note that a pad 6, which is made of insulating resin in a substantially identical form to the slot 23, is fitted in the slot 23. Also note that living holes 24 are formed at four places of the end portion sides of the metal plate 2 in order to fixedly attach the plate 2 to the vehicle.

As illustrated in FIG. 3, in a plan view of the metal plate 2 viewed from the front surface 21 side, the slot 23 is in a shape of letter T (the shape of letter T turned 90 degrees to one left). Namely, the slot 23 extends in the short-side direction of the metal plate 2 by a predetermined width, and the vicinity of the center thereof is protruded in the long-side direction of the metal, plate 2.

Further, the RFID inlay 3 is stuck to the front surface 21 of the metal plate 2 in a manner of straddling the protruded portion in the long-side direction of the metal plate 2.

The RFID inlay 3 is a passive type and has an IC chip 31 which is arranged in she substantially central portion thereof, and two antenna pattern pontoons 32 which are contacted with the lower surface or the IC chip 31 and extend in the lateral direction of the IC chip 31, as illustrated in FIG. 5. The pattern or each antenna pastern portion 32 is that one end side close to the IC chip 31 is narrow, and the other end side is wide.

The IC chip 31 and the antenna pattern, portions 32 are arranged on a base film 33 which is made of PET film or the like. The IC chip 31 is firmly fixed to the base film 33 while the circumference thereof being covered with resin (not illustrated).

The RFID inlay 3 is adhered to the front surface 21 of the metal plate 2 by an adhesive member such as double-sided tape or the like while putting the base film 33 toward the front surface 21 side of the metal plate 2. Thereby, the antenna pattern portion 32 of the RFID inlay 3 is arranged so as to be opposed to the metal plate 2 via the base film 33.

Further, the IC chip 31 is arranged to the front surface 21 side of the slot 23.

Furthermore, as illustrated in FIG. 2, the insulation back plate 7 (an acrylic resin plate, for example) is attached to the back surface 22 side or the metal plate 2 in a manner of covering the whole back surface 22 of the metal plate 2 in order to insulate the metal plate 2 from the vehicle body.

As illustrated in FIG. 4, with respect to the front surface 21 of the metal plate 2, the sealed-lens type retroreflective sheeting 4 is stuck on the whole front surface 21 so as to cover the slot 23 and the RFID inlay 3.

The retroreflective sheeting 4 has at least a surface protective layer, glass balls 44, a holding layer which holds the glass balls 44, a focus layer which adjusts a focus position of the glass balls 44, mirror reflective layers 43 arranged in the focus position of the glass balls 41, and an adhesive layer 45. Note that they are laminated in the order of the surface protective layer, the holding layer, the glass balls 44, the focus layer, the mirror reflective layers 43, and the adhesive layer 45.

The mirror reflective layer 43 is a metal layer for reflecting light, for example, aluminum is used for tire same. Note that, other than aluminum, metals such as silver, chrome, nickel, magnesium, gold, tin, and the like can be used.

The mirror reflective layers 43 are partially formed. Note that, in a plan slew of the retroreflective sheeting 4 viewed from the front surface side, a region where the mirror reflective layer 43 is formed is defined as a mirror reflective region 41, and a region where the mirror reflective layer 43 is not formed is defined as a non-mirror reflective region 42.

As illustrated in FIG. 6, in a plan view of the retroreflective sheeting 4 viewed from the front surface side, a plurality of mirror reflective regions 41, which are considered as independent regions by being divided by the non-mirror reflective region 42, are formed in a repeated pattern. Therefore, the appearance (surface) of the retroreflective sheeting 4 is uniform, and therefore retroreflected light is uniformly emitted at night.

A part of the non-mirror reflective region 42 is formed in a manner of overlapping the slot 23 region so as to traverse the slot 23 in the short-side direction (a direction orthogonal to the direction that the RFID inlay 3 straddles the slot 23) and the long-side direction (a direction that the RFID inlay 3 straddles the slot 23) of the metal plate 2.

Further, although the shape of the non-mirror reflective region 42 is not especially limited as long as it divides the mirror reflective regions 41, it can be a mesh shape in which a plurality of linear portions are connected, as illustrated in FIG. 6.

In the meantime, a path length of the non-mirror reflective region overlapping the slot 23 region is preferably 200% or more with respect to the length of the outer periphery of tire slot 23. Note that the path length of the non-mirror reflective region overlapping the slot 23 region means the length of a line which passes through the center between the adjacent mirror reflective regions 41 out of each mirror reflective region 41 overlapping the slot 23 region.

Further, the line width of the non-mirror reflective region overlapping the slot 23 region preferably has a range of 0.01 mm to 1.0 mm. Note that the line width of the non-mirror reflective region overlapping the slot 23 region means the sewerage distance between the adjacent mirror reflective regions 41 out of each mirror reflective region 41 overlapping the slot 23 region.

The plurality of mirror reflective regions 41 overlap the slot 23 region, and also are formed in the short-side direction (the direction orthogonal to fire direction that the RFID inlay 3 straddles the slot 23) and the long-side direction (the direction that the RFID inlay 3 straddles the slot 23) of the metal plate 2 so as not to straddle the slot 23. Namely, each mirror reflective region 41 overlapping the slot region is not arranged in a state of being connected from one edge to the other edge which are opposed to each other in the slot 23, and separated at the non-mirror reflective region 42 as a boundary. In addition, tire mirror reflective region 41 is compartmentalized by the non-mirror reflective region 42 in a predetermined pattern, and each of the compartmentalized mirror reflective regions 41 is independent.

Further, the pattern shape of the mirror reflective region 11 is a hexagonal shape in the example illustrated in FIG. 6, while it can be a regular shape such as a circular shape, en oval shape, a star shape, a triangle shape, a square shape, a pentagonal shape, a polygonal shape or the like, and it also can be any irregular shape. Further, it also can be plural types of pattern shapes.

Note that, the total area, of the mirror reflective regions 41 overlapping the slot 23 region is preferably 80% to 96% with respect to the area of the slot 23 region.

As illustrated in FIG. 1 and FIG. 4, a light-transmitting surface coating layer 5 formed on a portion other than the embossed sign portion (a number portion and a letter portion) of the front surface of the retroreflective sheeting 4. In this manner, a color difference occurs between the embossed sign portion (for example, white) and the other portion (for example, blue), and thereby, the sign portion becomes easy to be recognized.

According to the vehicle number plate 1 of this embodiment, the distance that information cars be read from the RFID inlay can be longer.

The reasons for this are considered to be as follows. Firstly, the antenna pattern portion 32 of the RFID inlay 3 is electromagnetically coupled with the metal plate 2, and thereby, the metal plate 2 acts as an antenna. Further, a non-mirror reflective region 42 is arranged on the slot 23, and thereby, transmission and reception of radio waves are not blocked. Further, it is considered that the antenna function may be improved since the mirror reflections region 41 is arranged on the slot 23.

Further, the distance that information can be read from the RFID inlay 3 can be longer in this embodiment that the RFID inlay 3 is arranged between the retroreflective sheeting 4 and the metal plate 2 than an embodiment that the RFID inlay 3 is arranged on the back surface 22 of the metal plate 2.

Furthermore, since the whole front surface 21 of the metal plate 2 is covered with the retroreflective sheeting 4 having the uniform appearance, visibility at night of the vehicle number plate 1 can be improved.

Moreover, even when the vehicle number plate 1 is visually recognised from the front surface side thereof, arrangement locations of the slot 23 and she RFID inlay 3 cannot be identified, and thereby, it does not easily become a target of illegal alternation or the like. Moreover, since the slot 23 cannot be visually recognised from the front surface side of the vehicle number plate 1, the slot 23 is not mistakenly recognised as a letter or a figure.

In this manner, in this embodiment, shapes and arrangements of the mirror reflective regions 41 and the non-mirror reflective region 42 of the retroreflective sheeting 4 which is stuck to the vehicle number plate 1 incorporating the RFID inlay 3 are optimized, and thereby, an adequate read distance can be ensured while using the passive type RFID inlay 3 which can be used semipermanently.

Next, a method of producing the sealed-lens type retroreflective sheeting used for this embodiment will be described.

A resin-compounded liquid for forming a surface protective layer is obtained by mixing and stirring a polyester resin solution, a methylated melamine resin solution, a cellulose derivative, an ultraviolet absorber, a leveling agent, a catalyst, a MIBK, and a toluene.

The colorless and transparent surface protective layer is formed by using a transparent polyethylene terephthalate film as a process base material and applying and drying the resin-compounded liquid for forming a surface protective layer on five process base material.

Subsequently, a resin-compounded liquid for forming a holding layer by mixing and stirring an acrylic resin, an isocyanate-based crosslinking agent, a toluene, and a MIBK.

The holding layer is obtained by applying and drying the resin-compounded liquid for forming a holding layer on the surface protective layer.

After attaching the glass balls to the protective layer, heat treatment is performed so as to make the glass balls embedded into the holding layer.

Subsequently, a resin-compounded liquid for forming a focus layer is obtained by mixing and stirring an acrylic resin solution, a methylated melamine resin solution, a MIBK, and a toluene.

The focus layer is formed by applying and drying the resin-compounded liquid for forming a focus layer on the protective layer and the glass balls.

Subsequently, the mirror reflective layer is obtained by vacuum-depositing the aluminum to the focus layer. Hereinafter, this is referred to as an intermediate product.

Subsequently, the intermediate product is set in a laser irradiation device, and a predetermined position of the mirror reflective layer is continuously scanned by a laser to remove it so as to form the mirror reflective layer into a predetermined shape.

And separately, the adhesive layer is formed by applying and drying a resin-compounded liquid for forming an adhesive layer which is obtained by mixing and stirring an ethyl acetate/a toluene solution of a 2 EHA/MA copolymer, an isocyanate-based crosslinking agent, an ethyl acetate on release paper.

The sealed-lens type retroreflective sheeting is obtained by sticking the mirror reflective layer of the intermediate product, and the above-mentioned adhesive layer so that they are contacted with each other, and peeling the process base material.

Next, the vehicle number plate of this embodiment will be manufactured in the following procedures using the retroreflective sheeting manufactured as above.

Firstly, the slot and the fixing holes are formed by setting a metal plate (an aluminum plate) in a punching process machine and punching predetermined positions.

Subsequently, after putting the pad into the slot, the RFID inlay is stuck on the front surface of the metal plate in a manner of straddling the slot.

Subsequently, the retroreflective sheeting is stuck to the whole surface of the metal plate, thereby covering the slot and the RFID inlay.

Subsequently, the surface coating layer is formed by applying a light-transmitting blue paint on the whole retroreflective sheeting.

Subsequently, the metal plate is set between an embossing mold in an emboss processing device and letters and figures are embossed so as to be protruded to the retroreflective sheeting side. At this time, the letters and the figures are formed in places where the RFID inlay, the slots, and the firing holes do not exist.

Subsequently, the surface coating layer on the embossed the portions (letters and figures) is wiped out using a solvent.

Then, the vehicle number plate is obtained by attaching the back plate so as to cover the whole back surface of the metal plate.

Although this embodiment has been described as above as an example of she present invention, the present invention is not limited to this embodiment.

For example, although the RFID inlay 3 is arranged on the front surface 21 of the metal plate 2 in this embodiment, it may be arranged on the back surface 22 of the metal plate 2 as illustrated in FIG. 7.

Additionally, although the RFID inlay 3 is the passive type which does not need a power supply in this embodiment, it may be an active type which needs a power supply.

Moreover, although the sealed-lens type retroreflective sheeting is used as the retroreflective sheeting 4 in this embodiment, a capsule-lens type retroreflective sheeting and a cube-corner type retroreflective sheeting may be used. Dote that the capsule type retroreflective sheeting is formed by laminating the surface protective layer, the holding layer, the plural glass balls 44 which are embedded into the front surface of the holding layer, the mirror reflective layer 43, the adhesive layer 45 in this order, and a support is provided between the surface protective layer and the holding layer. When the portion where the support is provided is arranged so as to be positioned immediately above the non-mirror reflective region 42, the strength of the retroreflective sheeting can be enhanced while preventing transmission and reception of radio waves from being disturbed due to the support. On the other hand, in the cube-corner type retroreflective sheeting, the glass ball 44 is replaced by a cube-corner element in a polygonal pyramid shape such as a triangular pyramid or a square pyramid or the like. The cube-corner element may be one in which a part thereof is embedded into the front surface of the holding layer, and may be one which is formed integrally with the front surface of the holding layer.

Moreover, although the pad 6 is put into the slot 23 of the metal plate 2 in this embodiment, it may be filled up with a sealing resin.

Moreover, although the back plate 7 is attached to the back surface 22 side of the metal plate 2 in this embodiment, the back surface 22 side of the metal plate 2 may be covered with a film shaped protective film.

Moreover, although the RFID inlay 3 is arranged straddling the protruded portion in the substantially central portion of the slot 23 in the short-side direction of the metal plate 2 in this embodiment, it may be arranged straddling the protruded portion in five substantially central portion of the slot 23 in the long-side direction of the metal plate 2.

Moreover, although the aluminum plate and the iron plate are exemplified as the metal plate 2 in this embodiment, an aluminum-zinc alloy plated steel plate, a tin plate, or a steel plate or the like is exemplified as another example. Further, a resin plate provided with a conductive thin film thereon will also do. Namely, any conductive plates will do.

Moreover, although the vehicle number plate is applied in this embodiment, a number plate for other than a vehicle may be applied, and a plate other than a number plate may be applied. Namely, any sign plates will do.

EXAMPLES

Although the contents of the present invention will be described more specifically by giving the example and the comparative example hereunder, the present invention is not limited to them.

The table below shows the states of various vehicle number plates which are experimentally produced as the example and the comparative example, and the maximum distances (read distance) that information can be read from the RFID inlay in the vehicle number plate.

TABLE 1

| | Type of retroreflective sheeting | Line width of non-mirror reflective region (mm) | Area of each mirror reflective region (mm²) | Area ratio of mirror reflective region (%) | Path length ratio of non-mirror reflective region (%) | Read distance (m) |
| --- | --- | --- | --- | --- | --- | --- |
| Comparative Example 1 | — | — | — | — | — | 8.0 |
| Comparative Example 2 | Sealed-lens type | — | — | 10.0 | — | 0.0 |
| Example 1 | Sealed-lens type | 0.15 | 2.35 | 98.6 | 136 | 8.3 |
| Example 2 | Sealed-lens | 0.25 | 2.33 | 97.7 | 136 | 8.5 |

TABLE 1-continued

| | Type of retroreflective sheeting | Line width of non-mirror reflective region (mm) | Area of each mirror reflective region (mm²) | Area ratio of mirror reflective region (%) | Path length ratio of non-mirror reflective region (%) | Read distance (m) |
|---|---|---|---|---|---|---|
| Example 3 | Sealed-lens type | 0.60 | 2.25 | 94.5 | 136 | 9.8 |
| Example 4 | Sealed-lens type | 0.15 | 1.84 | 96.7 | 173 | 8.8 |
| Example 5 | Sealed-lens type | 0.15 | 1.27 | 96.0 | 250 | 10.3 |
| Example 6 | Sealed-lens type | 0.15 | 0.83 | 94.7 | 375 | 11.5 |
| Example 7 | Sealed-lens type | 0.15 | 0.40 | 91.0 | 749 | 11.0 |
| Example 8 | Capsule-lens type | 0.17 | 1.84 | 96.3 | 173 | 8.4 |

Examples 1 to 7 in the above table respectively snow the cases that the retroreflective sheeting 4 in the above-mentioned embodiment is the sealed-lens type, and Example 8 in the above table shows the case that the retroreflective sheeting 4 of the above-mentioned embodiment is the capsule-lens type.

Additionally, Comparative Example 1 in the above table shows the case that the retroreflective sheeting 4 in the above-mentioned embodiment is not provided, and Comparative Example 2 in the above table shows the case that the non-mirror reflective region 42 is not provided to the retroreflective sheeting 4 of the above-mentioned embodiment.

Additionally, the line width of non-mirror reflective region in the above table shows an average distance between the adjacent mirror reflective regions 41 out of each mirror reflective region 41 overlapping the slot 23 region. Area of each mirror reflective region, in the above table shows an average area of each mirror reflective region 41 overlapping the slot 23. Area ratio of mirror reflective region in the above fable shows a ratio of total area of mirror reflective regions 41 overlapping the slot 23 region with respect to the area of the slot 23 region. Path length ratio of non-mirror reflective region in the above table shows a ratio of path length of the non-mirror reflective region 42 with respect to the length of the outer periphery of the slot 23.

Figure 8:
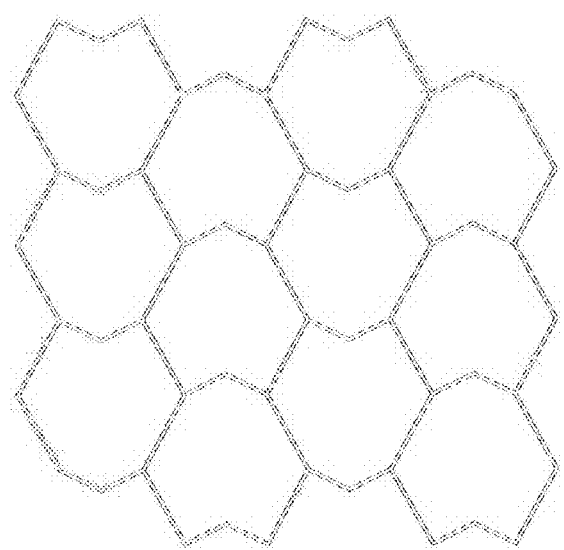
FIG. 8 is a plan view illustrating a pattern shape of the mirror reflection regions in the example and the comparative example.

The RFID inlay (93 mm in length, 28 mm in width) of UPM Raflatac whose product name is Dog Bone is used, as the RFID inlay 3 in such Examples 1 to 8 and Comparative Examples 1 and 2, being cut into a length cut of 22 mm, a width of 12.5 mm so that the IC chip thereof is positioned at the center so as to be measured at a frequency of 953 MHz, ERIP4W. Note that the pattern shape of the mirror reflective region 41 in each of Examples 1 to 8 and Comparative Examples 1 and 2 is the pattern shape illustrated in FIG. 8.

According to the comparison between Examples 1 to 8 and Comparative Example 1 in the above table, when the retroreflective sheeting 4 is provided to the vehicle number plate, the read distance becomes longer compared to when the retroreflective sheeting 4 is not provided.

Further, according to the comparison between Examples 1 to 8 and Comparative Example 2, when the non-mirror reflective region 42 is provided to the retroreflective sheeting 4 of the vehicle number plate, the read distance becomes remarkably longer compared to when the non-mirror reflective region 43 is not provided.

These prove that the distance that information can be read from the RFID Inlay 3 becomes longer by providing the non-mirror reflective region 42 on the slot 23 so that the mirror reflective region 41 does not straddle the slot 23.

Next, the path length ratios of the non-mirror reflective region in Examples 1 to 4 and 8 and the path length ratios of the non-mirror reflective region in Examples 5 to 7 are compared. According to the comparison, when the path length ratio is 200% or more, each read distance is increased by one digit compared to when the path length ratio is less than 200%. Further, when the path length ratio is 200% or more, variation between read distances becomes smaller compared to when the path length ratio is less than 200%.

This proves that the distance that information can be read from the RFID inlay 3 becomes further longer and the distance that information can be read from the RFID inlay 3 can be stably ensured by making the path length of the non-mirror reflective region 42 200% or more with respect to the length of the outer periphery of the slot 23.

Next, according to the comparison between the line widths of the non-mirror reflective region in Examples 1 to 8 and Comparative Example 1, the read distance becomes longer compared to when the retroreflective sheeting 4 is not provided even when the line widths of the non-mirror reflective region are altered in the range of 0.15 mm to 0.60 mm.

Additionally, although not shown in the above sable, it is found that almost the same read distance as Examples 1 to 8 can be ensured provided the line width of the non-mirror reflective region is 0.01 mm or more, even when the line width of the non-mirror reflective region is 0.15 mm or less. Also, it is found that almost the same read distance as Examples 1 to 8 can be ensured provided the line width of the non-mirror reflective region is 1.0 mm or less even when the line width of the non-mirror reflective region is 0.6 mm or more.

Accordingly, the distance that information can foe read from the RFID inlay 3 can be further longer compared to when the retroreflective sheeting 4 is not provided by making the range of the path length of the non-mirror reflective region 42 0.01 mm to 1.0 mm.

Next, according to the comparison between the area ratios of the mirror reflective region in Examples 1, 2, 4, and 8 and the area ratios or the mirror reflective region in Examples 3, and 5 to 7, when the area ratio of the mirror reflective region is 96% or less, the read distance becomes longer compared to when the area ratio of the mirror reflective region is over 96%.

Additionally, although not shown in the above table 1, it is found that almost the same read distance as Examples 3, and 6 to 7 can be ensured provided the area ratio of the mirror reflective region is 80% or more even when the area ratio of the mirror reflective region is 91% or less.

Accordingly, the distance that information can be read from the RFID inlay can be further longer by setting the total area of the mirror reflective regions 41 overlapping the slot region to 80% to 96% with respect to the area of the slot region.

Additionally, it is found that, when the area ratio of the mirror reflective region is 80% or more, the retroreflection property of the retroreflective sheeting does not excessively decline, and thereby, visibility at night (luminance) can be ensured.

INDUSTRIAL APPLICABILITY

As described above, the present invention can provide the sign plate of which the distance that information can be read from the RFID inlay is long, visibility at night is excellent, and which incorporates the RFID inlay that the arrangement location thereof cannot be identified.

Additionally, if the sign plate of the present invention is mounted on a vehicle, a gate system that information of a travelling vehicle is instantly read by a reader placed on the road in each area as to be collated with information of a server system of the police or the like can be constructed, and the gate system can be used for crime prevention, follow-up survey, and various investigations, or the like.

REFERENCE SIGNS LIST

1 . . . vehicle number plate
2 . . . metal plate
3 . . . RFID inlay
4 . . . retroreflective sheeting
5 . . . surface coating layer
6 . . . pad
7 . . . back plate
21 . . . front surface of metal plate
22 . . . back surface of metal plate
23 . . . slot
24 . . . fixing hole
31 . . . IC chip
32 . . . antenna pattern portion
33 . . . base material film.
41 . . . mirror reflective region
42 . . . non-mirror reflective region
43 . . . mirror reflective layer
44 . . . glass bass
45 . . . adhesive layer

The invention claimed is:

1. A sign plate comprising:
a plate-shaped conductive plate having a front surface and a back surface, providing a slot which penetrates from the front surface toward the back surface;
an RFID inlay arranged on the front surface or the back surface of the conductive plate so as to straddle the slot; and
a retroreflective sheeting arranged on the front surface of the conductive plate so as to cover the slot, said retroreflective sheeting having a mirror reflective region where a mirror reflective layer is formed and a non-mirror reflective region where the mirror reflective layer is not formed, in a plan view from above said front surface, the mirror reflective region providing a plurality of independent mirror reflective regions that are separated by the non-mirror reflective region, wherein
in said plan view the non-mirror reflective region has a mesh shape, and
a path length of the non-mirror reflective region overlapping the slot is 200% or more with respect to a length of an outer periphery of the slot,
as seen in said plan view, the independent mirror reflective regions overlap the slot and the non-mirror reflective region overlaps the slot, and
the non-mirror reflective region overlapping the slot straddles the slot and none of the independent mirror reflective regions overlapping the slot straddles the slot.

2. The sign plate according to claim 1, wherein a line width of the non-mirror reflective region overlapping the slot is 0.01 mm to 1.0 mm.

3. The sign plate according to claim 2, wherein in said plan view a total area of the independent mirror reflective regions overlapping the slot is 80% to 96% with respect to an area of the slot.

4. The sign plate according to claim 1, wherein in said plan view a total area of the independent mirror reflective regions overlapping the slot is 80% to 96% with respect to an area of the slot.

* * * * *